United States Patent
Nakabayashi et al.

(10) Patent No.: US 6,829,948 B2
(45) Date of Patent: Dec. 14, 2004

(54) FLOW METER

(75) Inventors: Yuji Nakabayashi, Nara (JP); Shuji Abe, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/387,751

(22) Filed: Mar. 13, 2003

(65) Prior Publication Data

US 2003/0209083 A1 Nov. 13, 2003

(30) Foreign Application Priority Data

Mar. 15, 2002 (JP) ........................................ 2002-071156
Mar. 15, 2002 (JP) ........................................ 2002-071904
Aug. 30, 2002 (JP) ........................................ 2002-255248

(51) Int. Cl.$^7$ ................................................. G01F 1/28
(52) U.S. Cl. ................................................. 73/861.74
(58) Field of Search ........................ 73/861.27, 861.26, 73/861.25

(56) References Cited

U.S. PATENT DOCUMENTS 4,185,498 A * 1/1980 Watson et al. ........... 73/861.27
4,788,981 A * 12/1988 Nagasaki et al. ........... 600/443
5,394,732 A * 3/1995 Johnson et al. ............... 73/19.1

FOREIGN PATENT DOCUMENTS

JP          8-170926       7/1996

* cited by examiner

Primary Examiner—Edward Lefkowitz
Assistant Examiner—Jewel V. Thompson
(74) Attorney, Agent, or Firm—RatnerPrestia

(57) ABSTRACT

An input unit for receiving a signal from an oscillator corresponds to an ultrasonic wave received by the oscillator has an input impedance significantly smaller than an impedance of an inter-electrode capacitance in the oscillator. This arrangement allows the delay of timing of the received wave to be influenced by a change in the input impedance of the input unit than by a change in the impedance of the oscillator. Since the influence of the change in the impedance of the oscillator against the delay of timing of the received wave is reduced, a flow meter can measure a propagation duration of the ultrasonic wave accurately. More specifically, the flow meter can measure the propagation duration accurately regardless of a change of the inter-electrode capacitance of the oscillator by temperature, thus measuring a flow rate of fluid correctly.

11 Claims, 6 Drawing Sheets

FLOW METER

FIELD OF THE INVENTION

The present invention relates to a flow meter for measuring a flow rate of fluid.

BACKGROUND OF THE INVENTION

FIG. 6 illustrates a conventional flow meter. At a conduit 1 in which fluid flows, a first oscillator 2 and a second oscillator 3 which face each other across the fluid for transmitting and receiving an ultrasonic wave are mounted. A driver 4 drives the first oscillator 2 to produce and transmit an ultrasonic wave. The ultrasonic wave is then received by the second oscillator 3 and transferred to a received-wave detector 7 for detecting the timing of receiving the wave. A timer 8 counts a time from the start of actuation of the driver 4 for driving the first oscillator 2 to the detection of the timing by the received-wave detector 7, and determines a propagation duration T1 of the ultrasonic wave. Then, a switching unit switches the direction of the transmitting/receiving of the ultrasonic wave, and the time counter 8 measures a propagation duration T2 of the ultrasonic wave in a reverse direction. A flow-rate calculator 9 then calculates the flow rate of the fluid from durations T1 and T2 in both the directions.

The received-wave detector 7 will be explained in more detail referring to FIG. 7.

The received-wave detector 7 includes a third-peak detector for detecting a third peak W3 from the rise of the waveform, and a zero-cross detector for detecting a zero-cross point of the received wave. Upon receiving the propagated wave, the third-peak detector detects a third peak W3 (denoted by "A" in FIG. 7) from the rise of the waveform, and outputs its detection signal for actuating the zero-cross detector. The zero-cross detector then detects a zero-cross point (denoted by B in FIG. 7) succeeding the peak, and determines the timing of receiving the wave. The timing is then transferred to the time counter 8. The timing of receiving the propagated wave determined by the above sequence provides the durations T1 and T2 of the ultrasonic wave. Then, the flow-rate calculator 9 calculating the flow rate Q from the duration T1 and T2 as equation 1, $$Q = (T1-T2)/(T1 \times T2) \times K \quad \text{(Equation 1)}$$

where K is a constant determined according to a cross sectional area of the conduit, a propagating distance of the ultrasonic wave, the positional relationship between the oscillators and the conduit, and their units.

Another conventional flow meter is disclosed in Japanese Patent Laid-open Publication No. 8-70926. In the meter, a circuit connected to two oscillators is matched in impedance so as to be equal in impedance in both a transmission mode and a reception mode and then connected to a transmitter/receiver circuit. The impedance in the circuit is low and constant. Another conventional flow meter detects the amplitude of a received wave at some points in time synchronized with a reference clock signal, and produces data of a phase against the reference clock signal according to the relationship between the detected amplitude and the timing of the reference clock signal. Then, the propagation duration of the wave can be determined from a combination of rough timings of the reference clock signal and the data of the phase having high resolution. This measuring method may however create an error due to a change of the amplitude of the received wave converted into the data of the timing. The method requires that the waveform of the ultrasonic wave propagated from its upstream to downstream and the waveform of a reverse ultrasonic wave propagated from the downstream to the upstream are shaped identical to each other. Thus, respective impedances between the transmission mode and the reception mode are matched.

As shown in equation 1, a relative accuracy of the durations T1 and T2, i.e., a difference (T1−T2) affects the accuracy of the measurement of the flow rate more than respective absolute value of the durations T1 and T2. For increasing the relative accuracy of the durations T1 and T2, delay times for which the ultrasonic wave is received by the oscillator and detected as a converted electrical signal by at the received-wave detector 7 have to be identical between both the directions of the transmission and reception.

As shown in an equivalent circuit of FIG. 2, a receiving-side oscillator of the conventional flow meter includes a signal source 11 for converting the ultrasonic wave into an electric signal, an internal impedance 12 (Zo), and an inter-electrode capacitance 13 (C). Upon receiving the ultrasonic wave, the oscillator produces an electric signal from the oscillation of the ultrasonic wave with a delay determined by the internal impedance 12 and the inter-electrode capacitance 13. More particularly, the delay is proportional to (C×Zo), thus increasing as the internal impedance 12 and the inter-electrode capacitance 13 are increased.

When an ambient temperature varies, a change in the inter-electrode capacitance 13 increases significantly, thus changing the delay of the output signal from the oscillator. This makes measurement of the duartions T1 and T2 inaccurate. The higher an input impedance of the received-wave detector 7, the greater a voltage of the output signal increases. Thus, the output signal from the oscillator is generally received by a high impedance circuit.

The flow meter disclosed in the publication No. 8-70926 is intricate in circuitry, and requires the wave forms of the ultrasonic wave in both the directions similar to each other. Thus, an interference of waves reflected on an inner wall of the conduit has to be considered. The conventional flow meter may be designed more difficultly under the consideration of variance at its mass production.

In the case that the two oscillators have identical properties, whichever of the oscillators is assigned to a receiving oscillator, the value (C×Zo) of each oscillator is unchanged, and the delay times are identical to each other. This arrangement does not create an error in the measured propagation durations, which are essential for calculating the flow rate. However, in case that the two oscillators do not have identical properties, the first oscillator 2 and the second oscillator 3 have the value (C×Zo) different from each other. Therefore, the delay time of the output signal from the receiving oscillator of one of the two oscillators is not equal to that of the receiving oscillators of other of the two oscillators. This makes the time counter 8 fail to measure the propagation durations accurately when the two oscillators are switched in the transmitting/receiving, and makes the flow-rate calculator 19 determine inaccurate flow rate.

As described above, the conventional flow meters hardly measure the flow rate accurately unless the two ultrasonic oscillators have properties identical to each other. Further, since a change in the inter-electrode capacitance caused by a temperature change is not uniform between the oscillators, as apparent from FIG. 3, a pair of oscillators having their properties substantially identical to each other has to be prepared. This preparation is a troublesome bearing process in which variations in the internal impedance and in the inter-electrode capacitance are checked while the temperature varies.

SUMMARY OF THE INVENTION

The flow meter provides accurate measurement even if employing the oscillators having their properties different from each other.

DETAILED DESCRIPTION OF THE PREFERRED EMBODIMENTS (Exemplary Embodiment 1)

Figure 1:
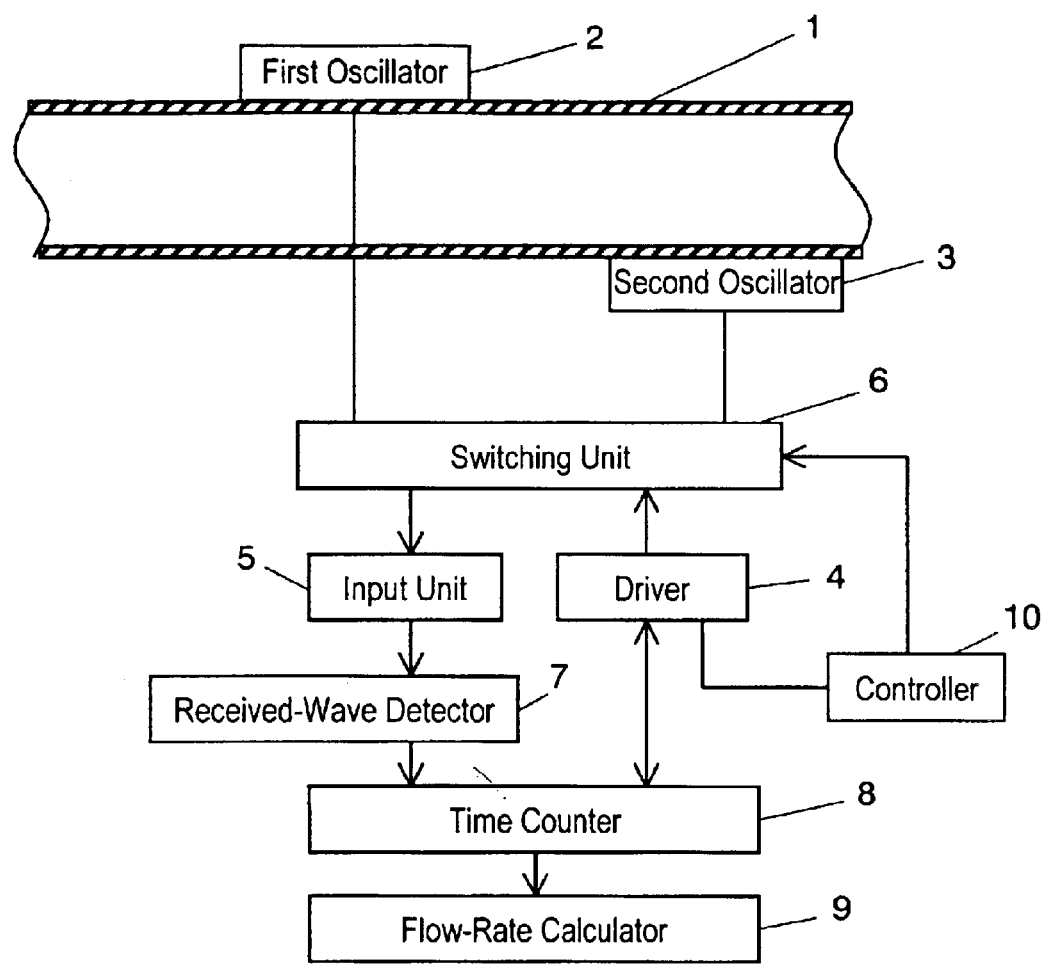
FIG. 1 is a block diagram of a flow meter according to exemplary embodiment 1 of the present invention.
Figure 2:
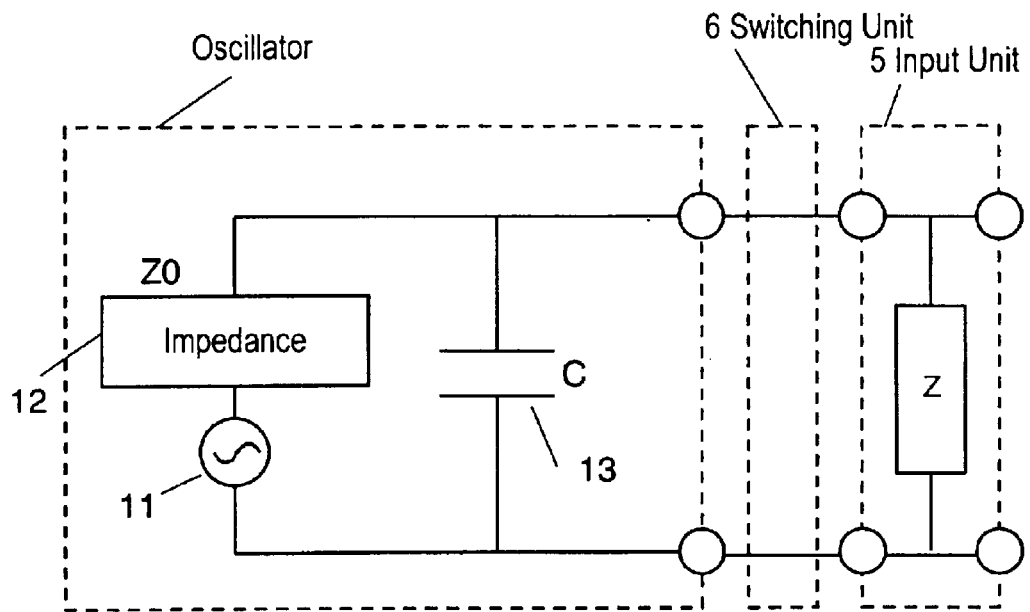
FIG. 2 illustrates an equivalent circuit of an oscillator in the flow meter.
Figure 3:
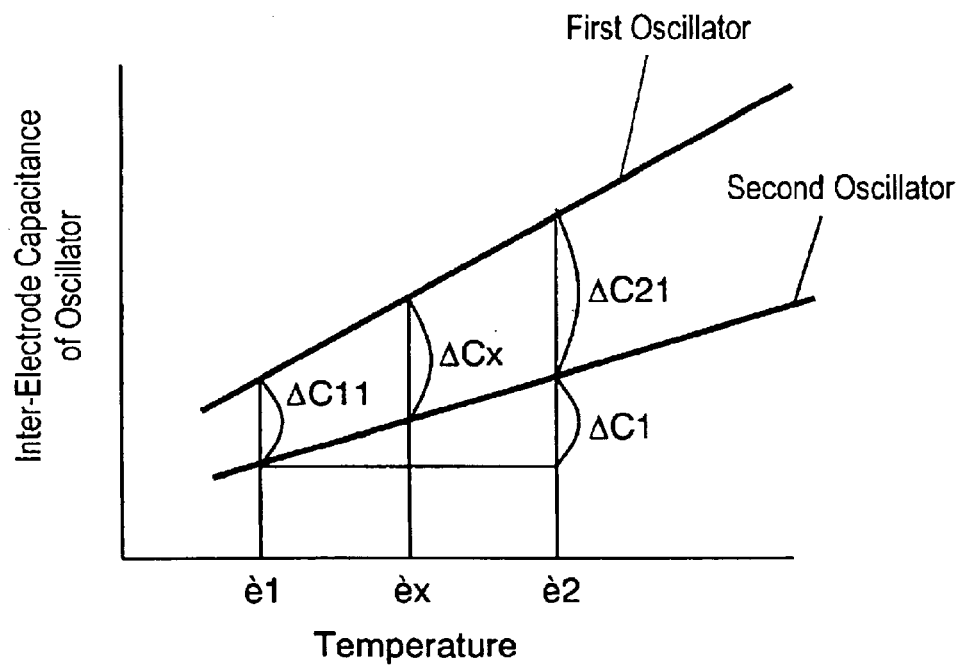
FIG. 3 is a temperature characteristic of an inter-electrode capacitance of oscillators in the flow meter according to the embodiment.

FIG. 1 is a block diagram of a flow meter according to exemplary embodiment 1 of the present invention. FIG. 2 illustrates an equivalent circuit of an oscillator in the flow meter of embodiment 1. FIG. 3 is a temperature characteristic of inter-electrode capacitances of first and second oscillators of the flow meter of embodiment 1.

As shown in FIG. 1, fluid to be measured in its flow rate flows through a fluid conduit 1. A first oscillator 2 and a second oscillator 3 transmits and receives an ultrasonic wave. The oscillators are driven by a driver 4. An input unit 5 receives signals output from the oscillators 2 and 3 in a low impedance. A switching unit 6 switches the connection of the oscillators 2 and 3 between the driver 4 and the input unit 5. A received-wave detector 7 detects the timing of receiving the ultrasonic wave according to a signal output from the input unit 5. A time counter 8 counts a time interval from a release of a startup signal for transmitting the ultrasonic wave to a reception of the signal output from the received-wave detector 7. A flow-rate calculator 9 then calculates a flow rate of the fluid from a signal output from the time counter 8. A controller 10 sets the switching unit 6 and then sends the startup signal to the driver 4 and the time counter 8.

An operation of the flow meter of embodiment 1 will be described in more detail. First, the controller 10 directs the switching unit 6 to set up for measuring a propagation duration of an ultrasonic wave. In order to measure the propagation duration of the ultrasonic wave from the first oscillator 2 to the second oscillator 3, the switching unit 6 connects the driver 4 to the first oscillator 2 and connects the input unit 5 to the second oscillator 3. Then, the controller 10 sends the startup signal to the driver 4 and the time counter 8. Upon receiving the startup signal, the driver then outputs a signal for actuating the first oscillator 2, and the time counter 8 starts counting the time interval. Upon being driven, the first oscillator 2 transmits the ultrasonic wave. Upon receiving the ultrasonic wave, the second oscillator 3 outputs a signal corresponding to the received ultrasonic wave to the input unit 5, and the received-wave detector 7 then detects the receiving. Then, the counting of the time counter 8 is canceled. The time interval counted by the time counter 8 is transferred to the flow-rate calculator 9. Then, the controller 10 directs the switching unit 6 to switch the connection for measuring the propagation duration in a reverse direction of the ultrasonic wave. More particularly, the switching unit 6 connects the driver 4 to the second oscillator 3 and connects the input unit 5 to the first oscillator 2. Similarly, the time counter 8 measures the propagation duration in the reverse direction of the ultrasonic wave, and sends the measured duration to the flow-rate calculator 9. The flow-rate calculator 9 calculates the flow rate of the fluid through multiplying a difference between respective inverted values of the two measured durations by a predetermined constant.

FIG. 2 illustrates an equivalent circuit of each of the oscillators. The oscillator includes a signal source 11 for converting a received ultrasonic wave into an electric signal, an internal impedance 12 (Zo), and an inter-electrode capacitance 13 (C). The electric signal is then delayed by a time determined by the impedance 12 and the inter-electrode capacitance 13. The greater the impedance 12 and the inter-electrode capacitance 13, the greater the delay is. The oscillator generally includes a pair of electrodes, a piezoelectric device provided between the electrodes, and an oscillating strip fixedly joined to one of the electrodes. Upon receiving a voltage between the electrodes, the piezoelectric device of the oscillator starts oscillating to produce an ultrasonic wave. The ultrasonic wave is then received by the oscillating strip of the other oscillator and is converted into a voltage by the piezoelectric device.

As apparent from FIG. 3, the inter-electrode capacitance 13 and its change according to a temperature may be different between the oscillators. This fact makes the delay of a signal output from the oscillator not uniform, thus resulting in s measurement error.

The input unit 5 of embodiment 1 receiving the signal output from the oscillator has an input impedance lower than the impedance 12 at the inter-electrode capacitance 13 of the oscillator. The input impedance of the input unit 5 is low, thus reducing influence of a change and a variation of the inter-electrode capacitance 13 to the delay time determined by the inter-electrode capacitance 13 and the input unit 5. This arrangement improves the accuracy of the measured propagation durations of the ultrasonic wave. Even if the inter-electrode capacitance 13 of the oscillator varies according to a temperature, elapsing time, moisture, or any other factor, the flow meter of embodiment 1 can accurately measure the propagation duration, thus calculates the flow rate accurately.

The input impedance of the input unit 5 may preferably be equal to ½ of the impedance of a circuit including the internal impedance 12 and the inter-electrode capacitance 13 connected in parallel with the impedance 12. This arrangement allows the input unit 5 to affects the delay time of the signal from the oscillator at the receiving side more than the inter-electrode capacitance 13, hence reducing the influence of a change of the inter-electrode capacitance 13 to the timing of receiving the ultrasonic wave. Accordingly, the propagation duration is measured accurately. Even if the inter-electrode capacitance 13 of the oscillator varies according to a temperature, the elapsing time, and the moisture, the flow meter can measures the propagation duration correctly thus calculating the flow rate accurately.

As shown in FIG. 2, the oscillator at the receiving side is connected to the input unit 5 having the input impedance Z. For example, if the input impedance Z is $\frac{1}{10}$ of the impedance Zo of the oscillator, a total impedance Zt of the impedance Z and the input impedance connected in parallel is determined by:

$$Zt = \frac{1}{\frac{1}{Zo}+\frac{1}{Z}} = \frac{1}{\frac{1}{Zo}+\frac{10}{Zo}} = \frac{1}{11}Zo$$

Accordingly, the delay time of the oscillator of the flow meter of embodiment 1 including the input unit 5 having the low input impedance is 1/11 of that of the conventional flow meter not including such the input unit. More particularly, if the inter-electrode capacitance 13 is different between the first oscillator 2 and the second oscillator 3, its adverse effect over the accuracy of the measurement of the propagating duration can successfully be reduced to 1/11.

The input unit 5 may have an input impedance (Zi1) to satisfy the relationship:

$$\Delta t > \Delta C1 \times Zi1$$

where Δt is an allowance of the measurement, and ΔC1 is a change of the inter-electrode capacitance 13 of each of the first oscillator 2 and the second oscillator 3. A change of the delay time is substantially ΔC1×Zi1. Accordingly, even if the inter-electrode capacitance 13 of the oscillator varies according to the temperature, the elapsing time, and the moisture, the flow meter can measure the propagation duration of the ultrasonic wave within the allowance of the delay time, thus calculating the flow rate accurately.

The change ΔC1 will be explained in more detail referring to FIG. 3. The inter-electrode capacitance of the second oscillator 3 has a temperature characteristic, for example, as shown in FIG. 3. The flow meter is usually used within a temperature range from a minimum temperature θ1 of −25° C. to a maximum temperature θ2 of 60° C. The inter-electrode capacitance varies according to a temperature between the temperatures θ1 and θ2 by a difference expressed by a change ΔC1 in FIG. 3. The input impedance Zi1 of the input unit 5 is then determined so that the relationship between the change ΔC1 and the allowance Δt of the delay time is expressed by the above relationship.

In the calculation of the flow rate, a difference between respective inverse values of measured propagation durations is multiplied by the constant. Therefore, a change of the difference of the delay times affects the accuracy of the measurement more than respective absolute values of the delay times of the signals output from the oscillators. For compensation, the input unit 5 may preferably have an input impedance Zi2 satisfying the relationship:

$$\Delta t > \Delta C2 \times Zi2$$

where Δt is an allowance of the difference, and ΔC2 is a change of the difference between respective inter-electrode capacitances of the first oscillator 2 and the second oscillator 3. Accordingly, even if the difference of the inter-electrode capacitance 13 between the oscillators varies according to the temperature, the elapsing time, and the moisture, the difference of the change of the delay times stays in a range of about (ΔC2×Zi2). Since ΔC2<ΔC1 and Δt satisfies the above relationship, the impedances Zi2 and Zi1 satisfy Zi2>Zi1, thus providing the input unit 5 with the lower input impedance easily. This arrangement allows the flow meter of embodiment 1 to measure the propagation duration of the ultrasonic wave within a necessarily-accurate range of the delay time, and thus to calculate the flow rate accurately.

The change of the difference ΔC2 will be explained in more detail referring to FIG. 3. At a temperature θx, the difference between the inter-electrode capacitances of the first oscillator 2 and the second oscillator 3 is ΔCx. The difference ΔCx varies according to the temperature θx. The difference is ΔC21 at the maximum temperature θ2, and is ΔC11 at the minimum temperature θ1. The change ΔC2 is expressed as:

$$\Delta C2 = \Delta C21 - \Delta C11$$

The input impedance (Zi2) of the input unit 5 is determined to satisfy the above equations with the allowance Δt and the change ΔC2 of the difference between respective inter-electrode capacitances of the first oscillator 2 and the second oscillator 3.

Figure 4A:
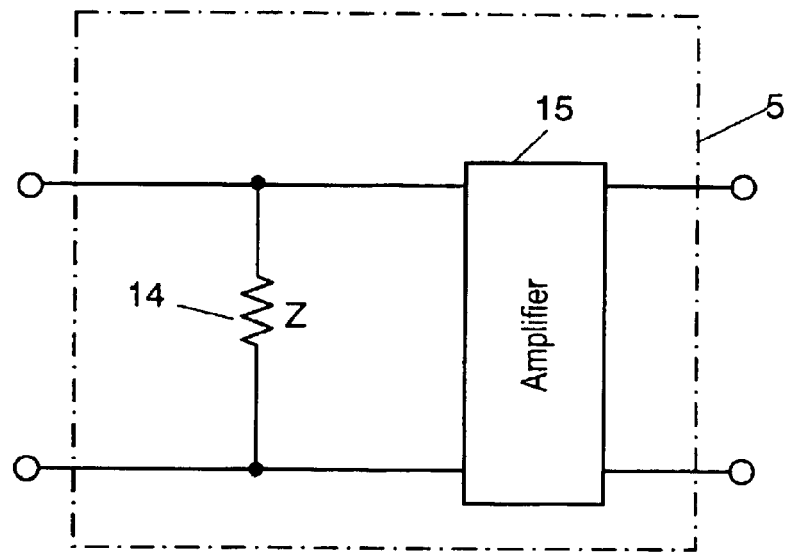
FIGS. 4A and 4B illustrate an input unit of the flow meter.
Figure 4B:
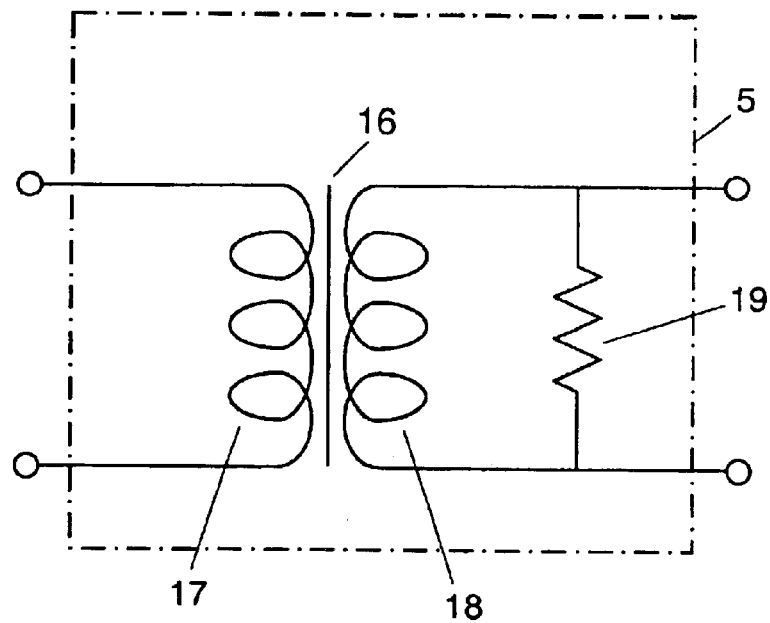

FIGS. 4A and 4B illustrate details of the input unit 5. The input unit 5 shown in FIG. 4A includes a resistor 14 having a low resistance and an amplifier 15. Since the input signal is received by the resistor 14 having the resistance lower than the impedance of the oscillator, the input impedance Z is determined mainly by the resistance of the resistor 14. The voltage at both ends of the resistor 14 is then amplified to a desired level by the amplifier 15. Accordingly, the input unit 5 can have optimum input/output characteristics while having a simple arrangement.

Another input unit 5 shown in FIG. 4B includes a transformer 16 which functions as an impedance converter. Its input impedance is determined by the ratio between an input side winding 17 and an output side winding 18 and the resistance of a resistor 19 connected to the output side winding 18. As the result, the input unit 5 can have a low input impedance while having a simple arrangement.

(Exemplary Embodiment 2)

Figure 5:
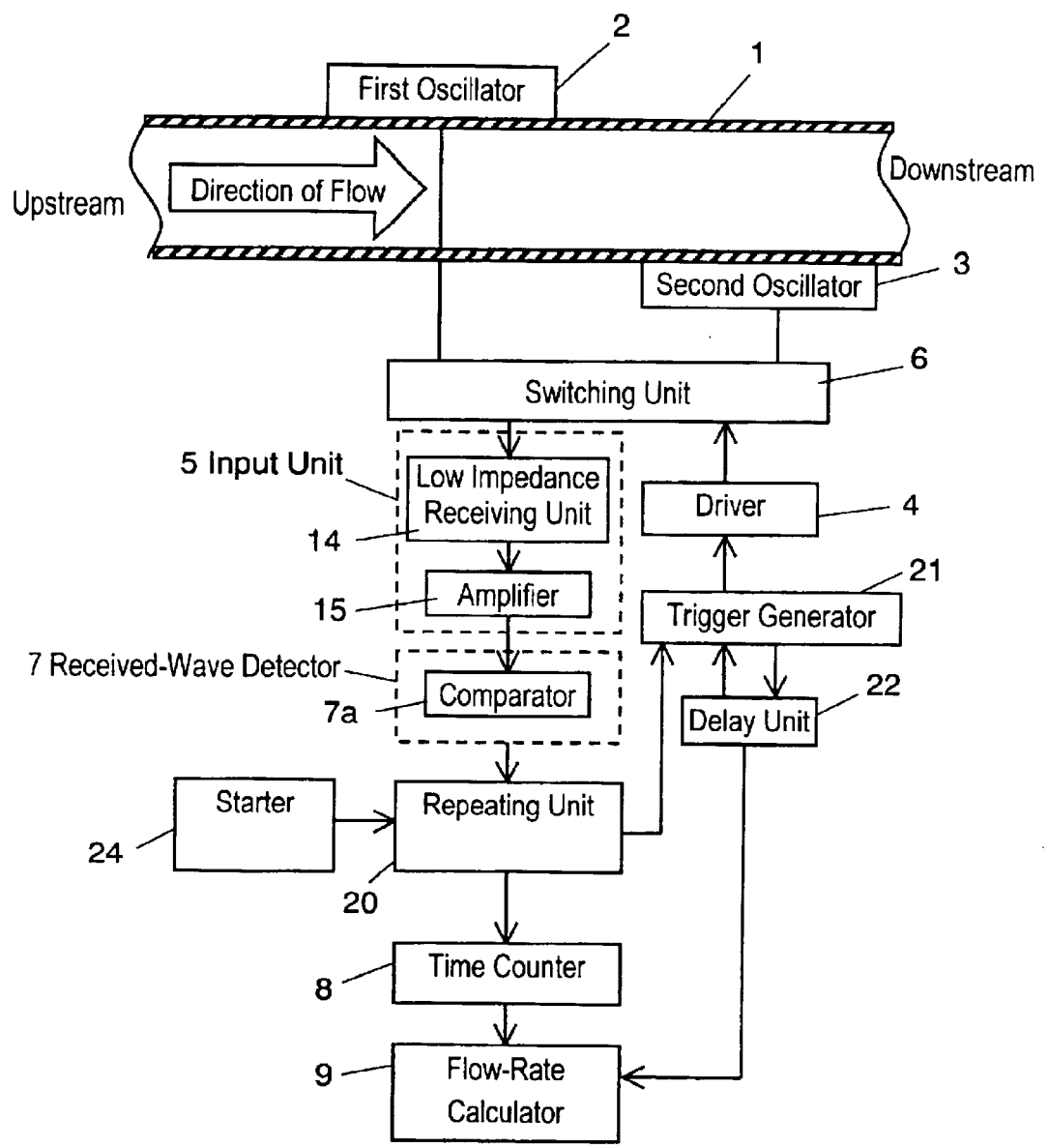
FIG. 5 is a block diagram of a flow meter according to exemplary embodiment 2 of the invention.
Figure 6:
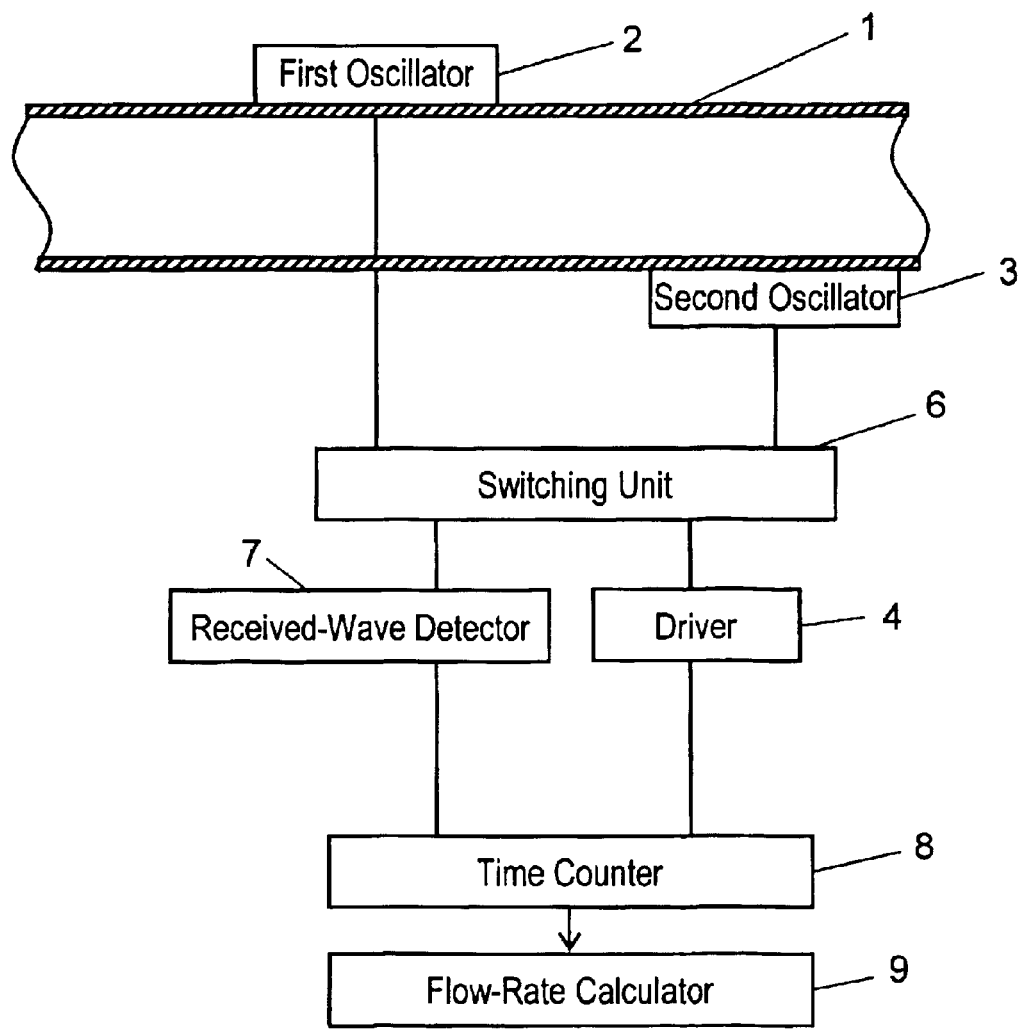
FIG. 6 is a block diagram of a conventional flow meter.
Figure 7:
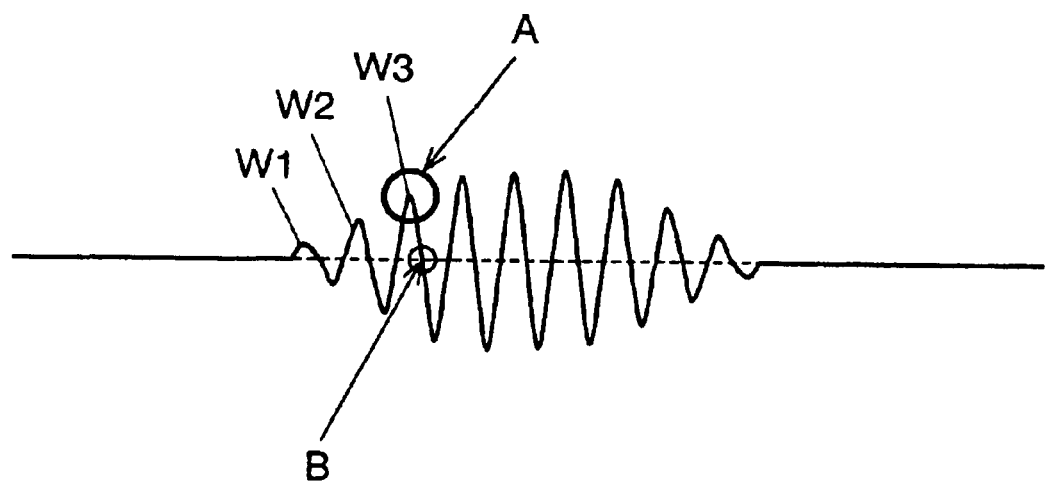
FIG. 7 illustrates a timing of detecting a received wave in the flow meter.

FIG. 5 illustrates a flow meter according to exemplary embodiment 2 of the present invention. Like components are denoted by like numerals as those of embodiment 1 shown in FIG. 1, and will be described in no more detail.

A repeating unit 20 is provided for producing and transmitting a repeat signal to a trigger generator 21 in response to a signal from a comparator 7a in a received-wave detector 7. Upon receiving a signal output from the trigger generator 21, a delay unit 22 counts a delay time.

Upon receiving the signal from the trigger generator 21 and a signal indicating the end of the delay time from the delay unit 22, a driver 4 starts driving the oscillator through the switching unit 6. A time counter 8 counts a time interval from a release of a startup signal from a starter 24 to the reception of a signal at an input unit 5 having a low input impedance which indicates that a ultrasonic wave is received by a receiving oscillator. The flow-rate calculator 9 then calculates a flow rate of fluid flowing in a fluid conduit 1 from the measured delay tome of the time counter 8 and the delay time at the delay unit 22.

An operation of the flow meter of embodiment 2 having the above-explained arrangement will be described in more detail.

When the starter 24 outputs the startup signal, the repeating unit 20 directs the switching unit 6 to set the first oscillator 2 in a transmission mode and to set the second oscillator 3 in a reception mode. More specifically, while the first oscillator 2 is connected to the driver 4, the second oscillator 3 is connected to a resistor 14 having a small resistance in the input unit 5. This permits the ultrasonic wave to be propagated from an upstream to a downstream of a flow of the fluid.

Then, the number of repeating times in the repeating unit 20 is set to an initial value, and the time counter 8 starts to count a time. The repeating unit 20 actuates the trigger generator 21, and the generator 21 then sends a trigger signal to the delay unit 22 for starting to count a time until a delay time. When receiving the trigger signal from the trigger generator 21 and a signal indicating the end of the counting of the delay unit 22, the driver 4 directs the first oscillator 2 to transmit the ultrasonic wave through the conduit 1.

The ultrasonic wave is propagated through the conduit 1 and then reaches the second oscillator 3 after a propagation duration. The signal corresponding to the received ultrasonic wave is transferred from the second oscillator 3 to the input unit 5 including a receiving unit 14 having a small input impedance for receiving the signal. The input unit 5 then transmits the signal to a received-wave detector 7 for detecting a timing of the signal.

More specifically, the received-wave signal is amplified to a desired level by the amplifier 15, and then is transferred to a comparator 7a in the received-wave detector 7. The comparator 7a compares the amplified signal with a reference level. If the received signal is greater than the reference level, the comparator 7a supplies a repeat signal to the repeating unit 20.

Then, the repeating unit 20 directs the trigger generator 21 to make the delay unit 22 start counting time until the delay time. When the delay unit 22 finishes the counting, the trigger generator 21 directs the first oscillator 2 to transmit the ultrasonic wave again. The above cycle including transmission and reception of the ultrasonic wave and cancellation of the transmission and reception by the delay unit 22 is repeated until the number of the repeating times in the repeating unit 20 reaches a predetermined number.

After the predetermined number of the cycles are repeated, the time counter 8 stops the counting, and the flow-rate calculator 9 reads the propagation duration (T) counted by the time counter 8. The propagation duration (T1) of the ultrasonic wave from the first oscillator 2 to the second oscillator 3 is calculated by:

$$T1=(T-Td\times N)/N$$

where N is the number of the repeating times, and Td is the delay time determined for the delay unit 22. Then, the calculated duration is stored in the flow-rate calculator 9.

Then, in order to start the measurement of the propagation duration the starter 14 set the number of the repeating times in the repeating unit 20 and the time counted by the time counter 8 to the initial values. The switching unit 6 then connects the first oscillator 2 with the input unit 5 and connects the second oscillator 3 with the driver 4. At this moment, the ultrasonic wave is propagated from the downstream to the upstream of the flow. Similar to the duration (T1), the propagation duration (T2) of the ultrasonic wave from the second oscillator 3 to the first oscillator 2 is calculated by:

$$T2=(T-Td\times N)/N$$

where N is the number of the repeating times, and Td is the delay time for the delay unit 22. The calculated duration is stored in the flow-rate calculator 9.

The propagation duration T2 of the ultrasonic wave from the second oscillator 3 to the first oscillator 2, i.e., from the downstream to the upstream of the flow increases as the fluid flows through the conduit 1. Therefore, the durations T1 and T2 satisfy T1>T2. The flow-rate calculator 9 calculates a difference between an inverse value of the duration T1 and an inverse value of the duration T2, and calculates the flow rate in consideration of the cross section of the conduit 1 and the behavior of the flow.

What is claimed is:

1. A flow meter comprising:

first and second oscillators provided at a fluid conduit in which fluid flows, for transmitting and receiving an ultrasonic wave;

a switching unit for switching the transmitting and receiving of the ultrasonic wave between the first and second oscillators;

an input unit having an input impedance smaller than respective impedances of the first and second oscillators and arranged for receiving, from the first and second oscillators, a signal corresponding to the ultrasonic wave received by the first and second oscillator;

a received-wave detector for detecting a reception of the ultrasonic wave according to a signal from the input unit;

a driver for driving the first and second oscillators to transmit the ultrasonic wave;

a time counter for counting a propagation duration of the ultrasonic wave between the first and second oscillators; and a flow calculator for calculating a flow rate of the fluid from the counted propagation duration.

2. The flow meter according to claim 1, wherein the input impedance of the input unit is not higher than ½ of each of the impedances of the first and second oscillators.

3. The flow meter according to claim 1, wherein a time allowance (Δt) required for counting of the propagation duration, a change (ΔC1) of an inter-electrode capacitance of one of the first and second oscillators, and the input impedance (Z) of the input unit satisfy the relationship:

$$\Delta t > \Delta C1 \times Z.$$

4. The flow meter according to claim 3, wherein the change (ΔC1) of the inter-electrode capacitance is in a predetermined temperature range between a minimum temperature and a maximum temperature.

5. The flow meter according to claim 1, wherein a time allowance (Δt) required for counting of the propagation duration, a change (ΔC2) of a difference between respective inter-electrode capacitances of the first and second oscillators, and the input impedance (Z) of the input unit satisfy the relationship:

$$\Delta t > \Delta C2 \times Z.$$

6. The flow meter according to claim 5, wherein the change (ΔC2) of the inter-electrode capacitance is in a predetermined temperature range between a minimum temperature and a maximum temperature.

7. The flow meter according to claim 1, wherein the input unit includes:

a resistor connected in parallel with the first and second oscillators; and an amplifier for amplifying a voltage at both ends of the resistor.

8. The flow meter according to claim 1, wherein the input unit includes an impedance converter.

9. The flow meter according to claim 1, wherein the input unit is connected in parallel with the first and second oscillators.

10. The flow meter according to claim 1, wherein the first and second oscillators having properties different from each other.

11. The flow meter according to claim 1, wherein the inter-electrode capacitances of the first and second oscillators varies according to a temperature, a elapsing time, and a moisture.

* * * * *